United States Patent
Habib et al.

[15] 3,672,658
[45] June 27, 1972

[54] SPRING-ACTION DEVICE

[72] Inventors: Pierre Habib, 2 rue Turgot; Andre Puyo, 23, Boulevard du Montparnasse, both of Paris, France

[22] Filed: Nov. 28, 1969

[21] Appl. No.: 880,719

[30] Foreign Application Priority Data

Dec. 4, 1968  France..................................68176505

[52] U.S. Cl............................................................267/160
[51] Int. Cl................................................................F16f 1/44
[58] Field of Search........................267/152, 153, 141, 63, 30, 267/160, 164, 165

[56] References Cited

UNITED STATES PATENTS 2,432,361  12/1947  Winters ................................267/165

FOREIGN PATENTS OR APPLICATIONS 569,551  11/1957  Italy........................................267/152

*Primary Examiner*—James B. Marbert
*Attorney*—Young & Thompson

[57] ABSTRACT

A spring-action device comprising a stack of elastically deformable elements applied against each other and mounted between spaced supports which are disposed in sets of at least two, arranged substantially in staggered relation on each side of intermediate elements. This arrangement results in a composite spring having high mechanical properties and particularly a high elastic limit, allowing a plurality of industrial applications such as prestressing of reinforced concrete components.

12 Claims, 24 Drawing Figures

INVENTORS
PIERRE HABIB
ANDRE PUYO
BY Young + Thompson
ATTYS.

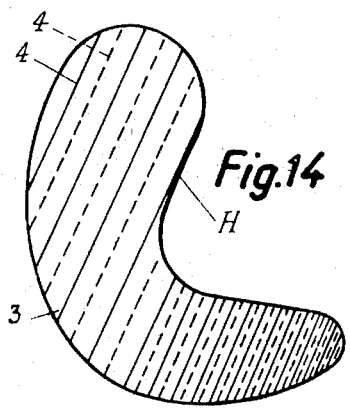
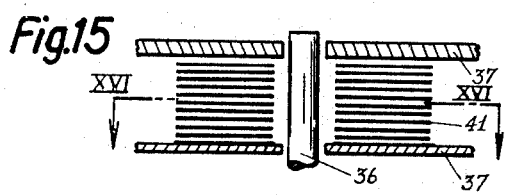
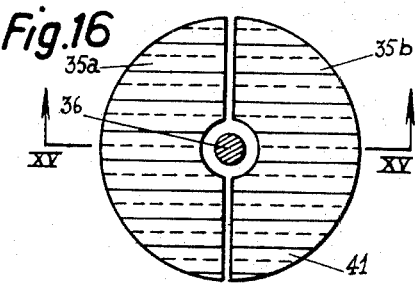
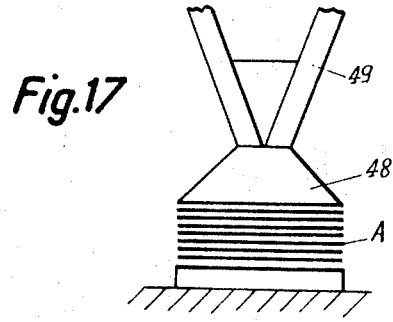
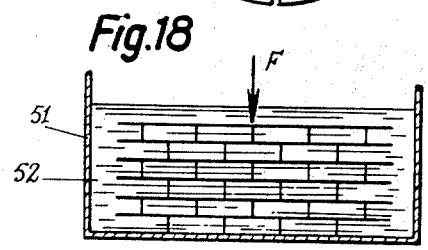
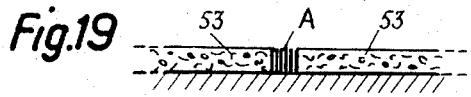
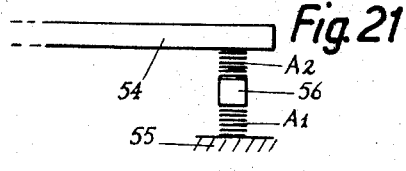
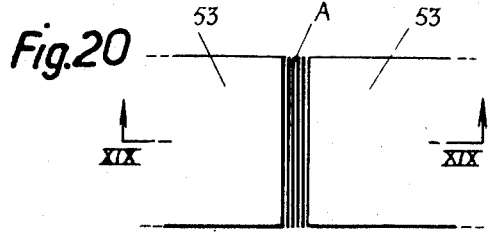
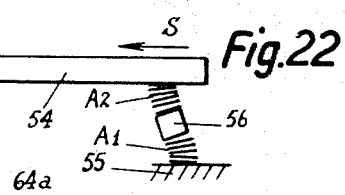
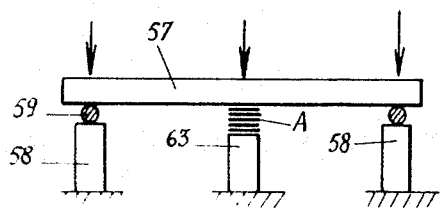
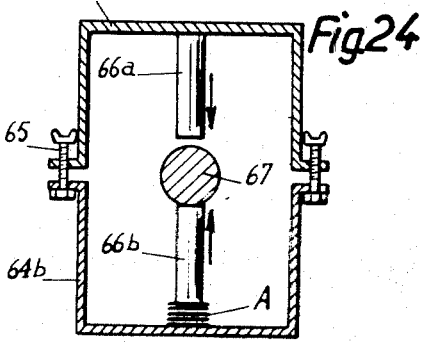

SPRING-ACTION DEVICE

This invention relates to a composite device which performs the function of a spring. This device is mainly intended to sustain high values of stress while exhibiting deformations of low amplitude. Conversely, when the device which is contemplated by the invention is positioned between two supports under a predetermined stress, said device can be employed for the purpose of applying a force of suitable amplitude to at least one of said supports.

It is known that leaf springs and helical springs which are usually made of steel have a large cross-section as well as substantial deflection under load. Moreover, springs of this type are practically unserviceable if it is desired to produce substantial forces which have high surface density and which are comparable, for example, with the working stresses developed in high-strength concrete.

French Pat. No. 564,578 describes a spring-action device comprising a stack of elastically deformable elements in which the intermediate elastic elements are mounted between single supports or packing-pieces in spaced relation. This arrangement has the disadvantage of requiring elements of relatively substantial thickness and therefore a large quantity of material by reason of the unfavorable distribution of stresses under load.

One object of the invention is to ensure the transmission of high pressures (for example between 5 and 200 bars) which are localized on surfaces of any given shape. The device which is thus provided accordingly serves to restore energy of sufficient value to apply active compressive prestress to a reinforced concrete structure, for example.

A further object of the invention is also to permit the construction of statically indeterminate systems having particularly advantageous deformation characteristics.

Another object of the invention is to provide a device made up of stacked elements and having a particularly high elastic limit (for example between 10 and 80 percent), with the result that the operating pressure can represent a substantial fraction of the modulus of elasticity, whereas in the case of conventional elastic materials, this ratio is of the order of a few thousandths. Thus, in the case of steel, the modulus of elasticity E is 22,000 kg/mm$^2$ on an average and the working pressure is between 40 and 200 kg/mm$^2$, with the result that the deformation is usually of the order of a few thousandths and rarely exceeds 1 percent. Similarly, in the case of materials of the synthetic glass type (known by the trade name Plexiglass), E = 30,000 kg/mm$^2$ and the working pressure does not exceed 40 to 100 kg/cm$^2$.

Yet another object of the invention is to circumvent the disadvantages attached to the device described in the patent cited in the foregoing.

Further objects of the invention will be explained in the description which is given hereinafter.

In accordance with the invention, the spring-action device comprises a stack of elements applied against each other in which at least part of said stack is elastically deformable and in which at least one of the intermediate elastic elements is mounted between spaced supports, said device being characterized in that the supports are disposed in groups of at least two and arranged substantially in staggered relation on each side of said intermediate element.

In a preferred arrangement, groups of paired supports can be formed in staggered relation by employing only a single spacer member in order to obtain two supports.

It has been demonstrated both by calculation and practical experiment that the use of supports in pairs achieves a considerable advantage from both technical and economic standpoints by virtue of the fact that the stress distribution under load permits an appreciable reduction in the quantity of material required for the elastic elements with respect to devices comprising single staggered supports.

In an advantageous embodiment, the spacer members are endowed with a shape which is practically identical with the adjacent portions of the elastic element under load, thereby providing the element with a linear bearing in cross-section.

As a result of stacking of elements thus constituted, there is obtained a composite spring having mechanical properties which can be made particularly advantageous and readily adapted to contract specifications. In particular, the elastic limit can attain values of the order of 10 to 80 percent while transverse deformation is practically zero.

Further properties of the invention will become apparent from the description which now follows, reference being made to the accompanying drawings which are given by way of non-limitative example, and in which:

FIG. 14 is the plan view of a particular spring-action device;

FIG. 15 is a sectional view along line XV—XV of FIG. 16 and showing another form of construction;

FIG. 16 is a sectional view along line XVI—XVI of FIG. 15;

FIG. 17 shows the application of the invention to a support for a pylon or tower;

FIG. 18 is a view in elevation showing an alternative form of construction;

FIG. 19 is a sectional view along line XIX—XIX of FIG. 20 showing the application of the invention to prestressed concrete roads;

FIG. 20 is the corresponding plan view;

FIG. 21 is a diagram in elevation showing the application of the invention to a bridge expansion bearing;

FIG. 22 is a similar view of the preceding bearing at the time of expansion;

FIG. 23 shows the application of the invention to the construction of a statically indeterminate bearing;

FIG. 24 is a diagram of the application of the invention to a materials testing machine.

Figure 1:
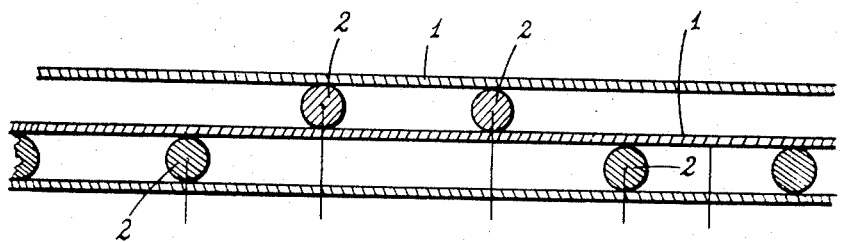
FIG. 1 is a diagram of a basic design for a device comprising paired supports.
Figure 2:
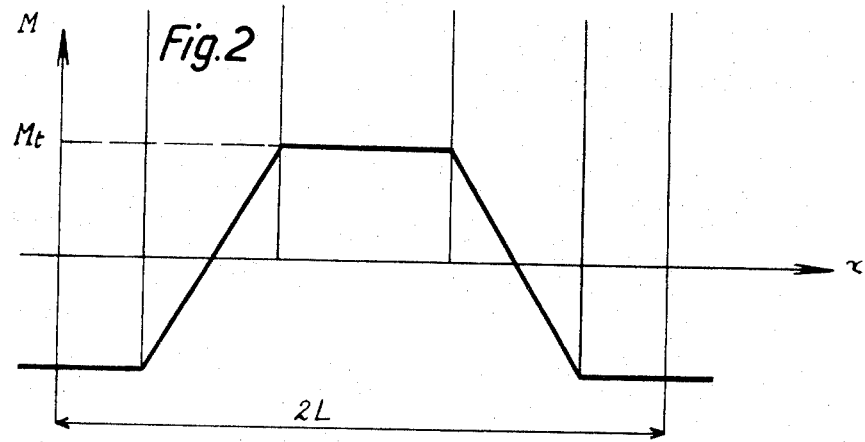
FIG. 2 is a diagram showing the bending moments under load of the device of FIG. 1.

Consideration will first be given to FIG. 1 which illustrates a device comprising elastically deformable elements 1 having at least one dimension which is greater than the others, said elements being mounted between sets of two bearing members or paired supports 2 which may or may not be deformable. The diagram of FIG. 2 corresponds to the device of FIG. 1 which is subjected to a stress, wherein the bending moment M which is represented as a function of the abscissa $x$ is of maximum value at the level of the supports but retains a constant value between two consecutive supports located on the same side of the element under consideration; this corresponds to the conventional bending of a beam on four supports, or circular bending.

Figure 12:
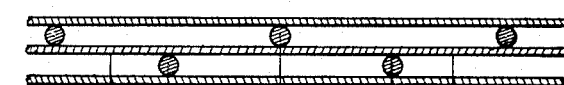
FIG. 12 is the diagram of a basic design for a device comprising single supports in staggered relation.
Figure 13:
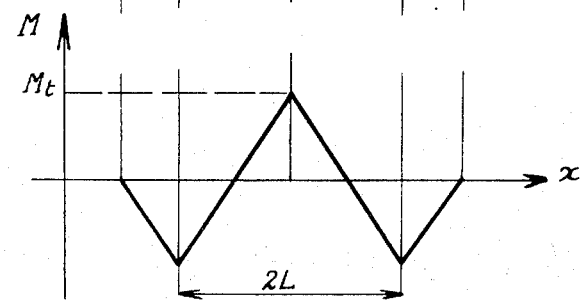
FIG. 13 is a diagram showing the bending moments during loading of the device of FIG. 12.

Referring to FIGS. 12 and 13 which show a device comprising single supports in staggered relation, it is noted that the maximum bending moment is attained at the level of the supports, while the diagram of FIG. 13 corresponds to the bending of a beam on three supports.

In point of fact, the elastic energy which is stored in a beam under bending stress is proportional to the area of the bending moment diagrams along said beam. In the case of the single-support system, this area is equal to ½ $M_t$·2 L, wherein $M_t$ represents the maximum permissible moment and 2 L the length of the beam whereas in the case of the paired-support system the area is equal to $M_t·L + ½ M_t L = ¾ M_t·2 L$, assuming that the consecutive supports of one set and two adjacent sets are equidistant.

The theoretical quantity of material which is necessary in order to construct the elastic elements is therefore appreciably smaller in the case of the device comprising paired supports for an equal value of stored energy. This consequently has the effect of reducing both the weight and the cost of springs constructed in accordance with the invention by approximately one third in practice and even to a greater extent if the supports 2 of FIG. 1 are more closely spaced.

As a result of repetition of the basic structure which is thus formed, it is possible to obtain a stack having a structure and volume which can be modified as requirements dictate, taking into account the intended application of the device as well as contract specifications.

When the stack as thus constituted is subjected to a stress, this latter is transmitted by the paired supports which cause flexural deformation of the elements 1 between the paired supports. This deformation is elastic.

In an extreme case, the opposite faces of two consecutive elements 1 can come into contact between the double supports 2 concerned (ultimate deformation).

The elastic deformation to which the stack is thus subjected may affect only a part of this latter and not the whole surface area of the stack. Moreover, if the assembly is subjected in addition to the stress to a couple having a horizontal axis, each layer rotates in the direction of the couple, thereby generating a restoring force. It is worthy of note that this property is independent of the direction of the couple.

In all cases of a predetermined deformation under the action of a stress comprising a couple, the assembly reacts as if one of the outside elements pivoted around the other outside element relative to a center of rotation located substantially at the center of the stack.

Accordingly, it is apparent that the composite spring-action device which is contemplated by the invention is capable of setting up a resistance to an external stress while undergoing deformation of a specific nature as characterized in particular by the amplitude of the ultimate elastic deformation.

In order to obtain springs which have an increasing degree of stiffness or rigidity, the element 1 may be modified as follows and the means employed for this purpose may also be combined:

by choosing the constituent material of the element 1 so that said material has progressively greater stiffness (up to high-strength steel);

by increasing the inertia of the element 1 and especially by increasing the thickness of this latter;

by reducing the space which is formed between the opposite faces of two consecutive elements 1 and which is equal to the height of the supports 2 and by reducing the distance between two consecutive supports located on each side of an element.

The repetitive structure provided by the invention offers many possibilities for adapting the elastic device to meet the requirements of contract specifications. In particular, the number of elements 1 to be stacked is governed by the desired ultimate elastic displacement. As this displacement is intended to be greater, so the number of elements 1 must in turn be greater.

Depending on the relative arrangement of the elements 1 and supports 2 and the nature of these latter, deformation can be obtained as a function of the stress corresponding to a composite material of the elastic-locking type or of the elastic-plastic type. The material of the first type is obtained when the opposite faces of the elements 1 come into contact under the action of the supports 2. The material of the second type corresponds to the use of mild steel elements 1 and of supports 2 which are sufficiently closely spaced.

It is apparent that the Young's modulus of the spring can be adjusted to the desired value by modifying the number and positions of the supports 2 in relation to the plates 1.

A further remarkable property of the composite spring which is thus provided is the fact that transverse deformations are practically zero.

The distance between two consecutive elements 1 limits and defines the travel prior to locking or due to creep (as has been noted earlier). If this distance is equal to the thickness of the plates, deformation prior to locking attains 25 percent of the height of the stack.

Calculation and practical experiments have served to demonstrate that a device in accordance with the invention can have very high compressibility, the range of the Young's modulus in particular being between 0.1 bar and 500 bars.

A further advantage of the device according to the invention lies in the fact that failure of an element 1 through overloading is unlikely to occur by virtue of the locking action which is provided. Even in the improbable event of failure, this would modify the quality of the spring only to a very partial extent inasmuch as the other elements 1 continue to perform their functions and provide compensation for the displacement resulting from local failure in the case of an elastic-locking device.

A few examples of industrial applications in which the foregoing results are turned to profitable account will now be given hereinafter.

Figure 3:
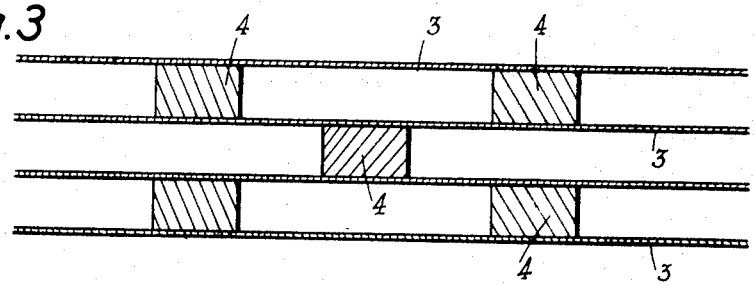
FIG. 3 is a sectional diagram of an industrial application according to the invention in the case of the paired support system in the rest position.
Figure 4:
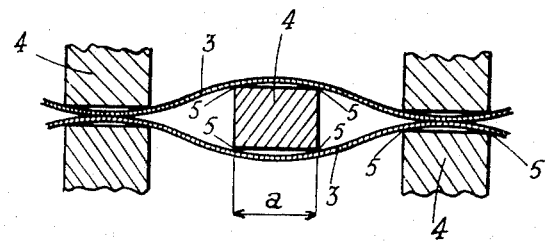
FIG. 4 is a view which is similar to FIG. 3 and shows the device under load.

The device which is illustrated in FIGS. 3 and 4 comprises elements 3 constituted by steel plates applied against cylindrical spacer members 4 consisting of bars which have a rectangular cross-section. By means of its parallel edges, each spacer member 4 forms two linear supports 5 per adjacent elastic element, a fairly substantial transverse dimension $a$ between edges being chosen in order to obtain this result under load (as shown in FIG. 4).

The adjacent arc of the elastic element 3 then assumes a perfectly circular shape, contact being established between two waves of two consecutive elements 3 when the spring has reached the end of travel.

Figure 5:
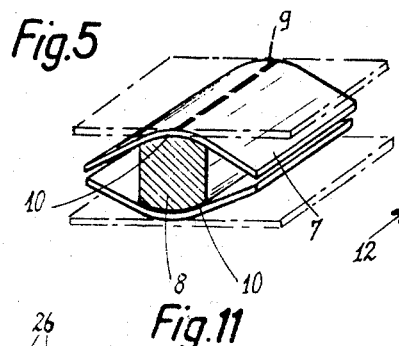
FIG. 5 is a partial view in perspective showing another industrial application according to the invention in which provision is made for linear supports.

In the embodiment of FIG. 5, the cylindrical spacer members 8 are shaped in an almost identical manner at the adjacent portion of the resilient element 7 under load; the arcuate configuration which is adopted in this case provides contact along a generator-line at 9 in the rest position (this position being shown in chain-dotted lines) whereas under load, the element 7 is applied against the cross-sectional circular arc 10 after having undergone deflection about the generator-line. The radius of curvature of the bearing faces of the spacer member 8 is such that the deformation of the element does not exceed the elastic limit.

The spring which is thus formed first undergoes a linear deformation followed by a variation which is not linear but elastic and reversible (variable flexibility) which does not constitute the least disadvantage.

The spacer members 8 can in this case be readily spot-welded to one of the elements 7 along the corresponding contact generator-line.

Figure 6:
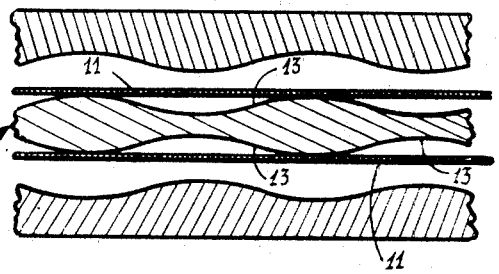
FIG. 6 is a sectional view of an alternative form of construction.

The alternative form of construction shown in FIG. 6 differs from the preceding embodiment in the fact that the spacer members are assembled so as to form a unitary element 12 having an arcuate sectional configuration in which the circular arcs 13 have the same radius of curvature and are convex and concave in alternate sequence, the elastic elements 11 being applied against the convex portions.

Figure 7:
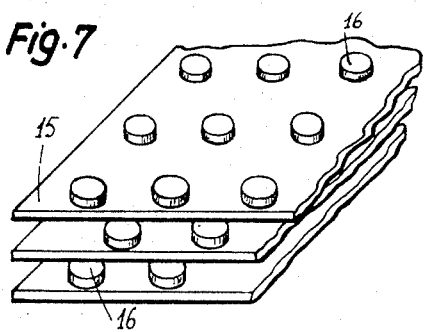
FIG. 7 is a partial view in perspective showing another form of construction.
Figure 8:
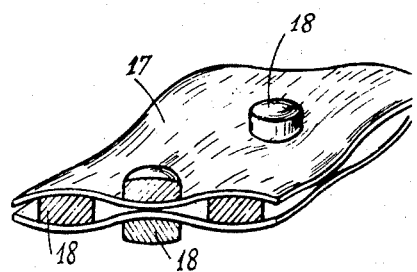
FIG. 8 is a partial sectional view in perspective showing yet another form of construction.

Instead of continuous spacer members such as cylindrical bars, provision can be made for non-continuous spacer members as illustrated in FIGS. 7 and 8.

In the case of the embodiment of FIG. 7, these spacer members are constituted by discs 16 or rings which are welded to the elastic elements 15 and which form two bearing points for the supported element.

The spacer members illustrated in FIG. 8 have the shape of biconvex lenses 18, the radius of curvature of which is equal to that of the circular arc of the cylindrical spacer members of FIG. 5. Contact under load between said spacer members and the resilient element 17 is linear in cross-section as in the case of the cylindrical spacer members 8, the resilient element 17 being adapted to surround each lens-shaped spacer member 18 so as to form a spherical surface.

Figure 9:
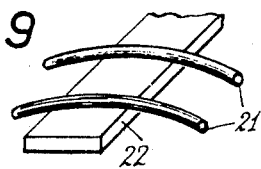
FIG. 9 is a partial view in perspective showing a form of construction in which provision is made for elastic elements of the wire type.

In the example illustrated in FIG. 9, the resilient or elastic elements are constituted by wires 21 and the spacer members by strips 22 of rectangular section so as to form double supports along the edges of said strips.

Figure 10:
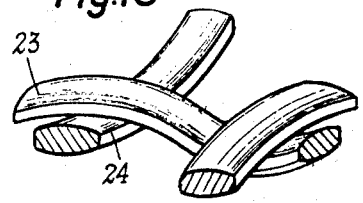
FIG. 10 is a partial view in perspective showing a form of construction comprising elastic elements in the form of strips.

By way of alternative, the elastic elements can also be constituted by strips 23 as shown in FIG. 10. In this case, the spacer members 24 as well as the elements 23 have a cross-sectional shape in the form of circular arcs which are complementary to the longitudinal deformation.

Figure 11:
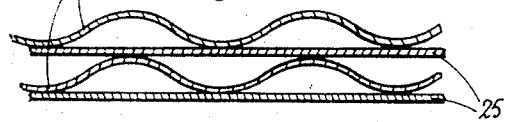
FIG. 11 is a sectional diagram of a form of construction which comprises deformable spacer members.

An advantageous form of construction from an industrial standpoint (shown in FIG. 11) consists in making use of elastic elements in the form of flat plates 25 and spacer members forming deformable unitary assemblies 26 constituted by pre-deformed plates having the same thickness as the flat plates 25. Pre-deformation along circular arcs which are alternately convex and concave is double that which corresponds to the predetermined stress limit.

The thickness of the spacer members can differ from the thickness of the flat elements if the amplitude of pre-deformation of the spacer members is modified.

Under the maximum load, a contact is established between the flat plates and pre-deformed plates. This form of construction is economical since the cost of pre-deformed plates is not dependent on the amplitude of the pre-deformation and the flat plates are obviously inexpensive. The pre-deformed plates can in any case be simply fabricated from the same types and grades of steel by bending flat plates beyond the elastic limit followed by a normalizing treatment.

In all the examples under consideration, the radii of curvature are chosen so that the deformation under load should not exceed the elastic limit of the material employed. This material can be any elastic or resilient material such as steel and even paperboard.

In the case of industrial applications, high-strength steel has proved to be of particular interest. Advantageous constructions from the technical and economic standpoints can be obtained by means of steel strip having a thickness comprised between 0.5 and 2 mm, especially hardened steep strip containing less than 1 percent carbon as designated by references XC 75 $f$ and XC 90 $f$ in accordance with AFNOR standards.

No matter what arrangement may be contemplated for the stack structures, the contours of these latter can be cut to the desired shape according to the technical problems to be solved. There is thus illustrated in FIG. 14 a spring structure which is of the type shown in FIG. 3 and cut so as to have a contour H of any desired shape. In this case, since the supports are constituted by bars 4, it is possible to orient said bars in a suitable direction which takes the design stresses into account while noting the fact that the lateral deformation of the spring in the direction of the bars 4 is zero.

Cutting of the stack along the contour H makes it possible to distribute the stress over exactly the desired area; the pressure can also be adjusted by modifying the spacing of the supports according to positional locations.

FIGS. 15 and 16 show an industrial application of the composite spring which has thus been cut to shape so as to form an annular spring formed of two half-rings 35a, 35b disposed around a center-pin 36. In this embodiment, the stack of deformable elements 41 is provided with retaining side-plates 37 of greater thickness. It is apparent that the spring can thus be removed without entailing the need to remove the center-pin 36.

A particular application of the device according to the invention for the purpose of constituting a rocking bearing is shown in FIG. 17 in which the stack A supports the base 48 of a tower or pylon, the bottom portion of which is shown in the figure at 49. In this case, the stack A replaces a rocking bearing.

In another industrial application as contemplated in FIG. 18, the stack A is intended to be mounted within a tank 51 which is filled with a viscous liquid 52 such as silicone oil and this latter penetrates into the interstices which are left free between the elements and the supports. The liquid 52 produces a damping effect which is correspondingly greater as the viscosity of the liquid is higher.

The embodiment according to FIGS. 19 and 20 shows the application of the invention to the active prestressing of concrete. The spring A which is constituted by a stack of one of the types already mentioned is placed between two concrete slabs 53 within a groove which forms an expansion joint between said two slabs. Prestress must be maintained close to the initial value despite thermal variations which cause longitudinal expansion or contraction of the slabs 53. With this objective, it is only necessary to adopt springs A of sufficient depth to ensure a small modification of the prestressing pressure. In the case of the preceding example, this result can be achieved by means of a stack of plates which forms a spring assembly having a height of approximately 10 cm.

A stack A of the type considered can also be advantageously employed for the purpose of applying permanent prestress from an abutment for such applications as bridge abutments or tunnel vaults, for example.

FIG. 21 shows an application of the invention to the construction of an expansion bearing of a bridge whose deck is shown at 54. The bridge deck 54 is carried on a stationary support 55 by two stacks A1, A2 which are separated by a distance-piece 56.

If a load is applied to the deck 54 in the direction S (as shown in FIG. 22) as a result of a temperature variation, the expansion bearing which is thus constituted is deformed as shown and performs the function of a double pseudo-articulation.

A further application of the invention consists in the construction of elastic bearings for statically indeterminate structural connections. It is known that rigid but brittle structures have low resistance to a foundation defect which results in subsidence or on the contrary in raising. In order to guard against this danger, it is common practice to introduce springs between the structure to be supported and the foundation at the different intended support locations. The springs employed for this purpose have a sufficiently high degree of flexibility to ensure that the force which they exert does not vary to any marked extent with the displacement of the foundation. However, springs of this type must be sufficiently powerful to withstand the load produced by the structure. The invention finds a particularly advantageous application in this field as shown in FIG. 23 in which the reference numeral 57 designates the rigid structure to be carried on supports 58 by means of spacer members 59. Said supports are placed at the ends of said structure and may consist, for example, of reinforced concrete posts. One or a number of intermediate supports 63 are provided for the structure 57. Stacks A of the type contemplated by the invention are mounted between the supports 63 and said structure. If a spring having an area of 1 square meter and made up of 10 plates is employed to form the stack A and if the load on the stack A is 300 tons, calculation and practical experiments have shown that settlement of the intermediate support 63 over a distance of 1 mm results in a reduction in load-carrying capacity of only 10 tons, which is very small and does not impair the structure 57.

Another field of application of the invention is the construction of elastic cushions constituting antiseismic suspensions for protecting structures against vibrations originating from the ground.

Yet another application is the construction of base-plates for vibrating machines.

In a further application, the stacks A are constituted by plates of mild steel having substantial ductile strain at fracture, said plates being capable of bending permanently at the level of the supports.

This type of structure can be used to advantage for providing a constant-force support for the pit-props which are used in mine workings.

Yet another application of the invention is the production of forces which are unaffected by temperature variations. Springs of this type can advantageously be employed in materials testing machines for determination of creep or stress relaxation. The diagram of a machine of this type is given in FIG. 24. The machine comprises a frame formed of two parts 64a, 64b which can be brought together by means of tightening members 65 and adapted to carry dowel-pins 66a, 66b which are intended to transmit a load of predetermined value to the test-piece 67. The pin 66b in accordance with the invention is separated from the frame 64b by a stack A of the type described above. Under these conditions, the force to which the test-piece 67 is subjected remains practically constant irrespective of the degree of expansion of the elements 64a, 64b of the frame. In fact, the modulus of elasticity of the materials employed in the construction of the stack and especially in the case of steel varies very little with temperature. In consequence, the rigidity of the spring is not affected.

Devices forming springs in accordance with the invention are also particularly useful for controlling the tension of cables or tie-rods in building construction and in public works.

As will be readily apparent, the embodiments described in the foregoing are essentially given by way of non-limitative example and serve merely to show the wide range of potential industrial applications of the invention.

What we claim is:

1. A spring-action device comprising a stack of metal elements applied against each other, in which at least part of said stack is elastically deformable, at least one of the intermediate elements of the stack being mounted between spaced support means arranged in staggered relation on each side of said intermediate element, each of said support means providing at least two bearing points in cross section when the device is under load.

2. A device according to claim 1, wherein said support means are constituted by bars of rectangular cross section having a transverse dimension such that the edges of each bar form two bearings for said intermediate element.

3. A device according to claim 1, wherein said support means have a shape which is substantially identical to the adjacent portions of the element under load, thereby providing the element with a linear bearing in cross section.

4. A device according to claim 3, wherein said support means are constituted by cylindrical rods in which the faces in contact with said intermediate element are convex and have the same radius of curvature as the adjacent portion of the element under load.

5. A device according to claim 1, said stack comprising flat metal sheets alternating with pre-deformed metal sheets, the deformations of said sheets being of a curvature such that when said deformations are flattened, the elastic limit of the sheets is not exceeded.

6. A device according to claim 5, said sheets being steel having a thickness between 0.5 and 2 mm. and containing less than 1 percent carbon.

7. A device according to claim 3, means are assembled so as to form unitary elements having a cross-section in the shape of circular arcs which are alternately convex and concave.

8. A device according to claim 1, wherein said support means are constituted by separate discs or rings having a radius such that they each form two bearing points in cross-section for the element.

9. A device according to claim 3, wherein said support means are constituted by studs having the shape of biconvex lenses and having the same radius of curvature as the adjacent portion of the element under load.

10. A device according to claim 1, wherein the intermediate elements are elongated elements such as wires or strips and the spacer members are provided in the form of strips.

11. A device according to claim 1, wherein said support means are assembled to form deformable unitary elements constituted by plates which are pre-deformed so as to form circular arcs which are alternately convex and concave.

12. A device according to claim 1, wherein a damping liquid surrounds the stack of elements.

* * * * *

UNITED STATES PATENT OFFICE
CERTIFICATE OF CORRECTION

Patent No. 3,672,658     Dated June 27, 1972

Inventor(s) Pierre Habib et al

It is certified that error appears in the above-identified patent and that said Letters Patent are hereby corrected as shown below:

On the cover sheet [30], under "Foreign Application Priority Data", "68176505" should appear -- 176505 --.

Signed and sealed this 19th day of December 1972.

(SEAL)
Attest:

EDWARD M. FLETCHER, JR.
Attesting Officer

ROBERT GOTTSCHALK
Commissioner of Patents